US00RE40897E

(19) United States
(12) Reissued Patent
Seto

(10) Patent Number: US RE40,897 E
(45) Date of Reissued Patent: Sep. 1, 2009

(54) CONSTANT CURRENT LINE CIRCUIT WITH CLASS FEATURES

(75) Inventor: Chuk Seto, Almonte (CA)

(73) Assignee: Mitel Networks Corporation, Ottawa Ontario (CA)

(21) Appl. No.: 11/354,336

(22) Filed: Feb. 14, 2006

Related U.S. Patent Documents

Reissue of:
(64) Patent No.: 6,865,271
Issued: Mar. 8, 2005
Appl. No.: 09/822,943
Filed: Mar. 30, 2001

(30) Foreign Application Priority Data

Mar. 31, 2000 (GB) ..... 0007841

(51) Int. Cl.
*H04M 1/00* (2006.01)

(52) U.S. Cl. ..... 379/413; 379/400
(58) Field of Classification Search ..... 379/413
See application file for complete search history.

(56) References Cited

U.S. PATENT DOCUMENTS 4,514,595 A * 4/1985 Rosenbaum et al. ..... 379/400
4,723,280 A * 2/1988 Meier et al.
5,329,588 A * 7/1994 Willocx et al.
5,864,219 A * 1/1999 Fink

* cited by examiner

*Primary Examiner*—Alexander Jamal

(57) ABSTRACT

A line circuit utilizing a differential amplifier whose output is regulated to zero volts D.C. (when the subscriber's set is off-hook) by a negative feedback circuit, for controlling a voltage controlled power supply which provides a constant current feed to the subscriber's loop. The differential amplifier also transmits audio signals received from the subscriber's loop directly to a PABX via an unbalanced terminal. When the loop range exceeds a predetermined threshold, the circuit reverts to a voltage feed operation thereby allowing operation over long loop lengths and the ability to provide on-hook CLASS services.

5 Claims, 1 Drawing Sheet

CONSTANT CURRENT LINE CIRCUIT WITH CLASS FEATURES

Matter enclosed in heavy brackets [ ] appears in the original patent but forms no part of this reissue specification; matter printed in italics indicates the additions made by reissue.

FIELD OF THE INVENTION

The present invention relates to telephone line circuits, and more particularly to a constant current line circuit with on-hook transmission for CLASS service delivery.

BACKGROUND OF THE INVENTION

Modern day PABXs supply operating power to subscribers' lines at −48 volts, applied to tip and ring leads of the lines. The length of a subscriber's line or subscriber loop governs its resistance. Hence, the current drawn by a long subscriber loop is substantially less than that drawn by a short loop.

Prior art line circuits typically did not compensate for different loop lengths and usually provided a constant voltage battery feed to the tip and ring leads. A minimum loop current of approximately 20 mA is typically required to be provided to a subscriber's loop in order to operate a telephone set connected to the loop. For long loops, large voltages were required in order to generate the minimum 20 mA current. Conversely, considerable power was wasted for short subscriber loops as a result of driving the line with unnecessarily high voltages (eg. −48 volts, −96 volts, etc.).

The problem of prior art line circuit power regulation is exemplified by the well known transformer hybrid which includes a large magnetic core for passing D.C. feed current to the loop. The core is made large in order not to saturate in the presence of large D.C. feed currents. Prior art transformer hybrids were bulky and expensive, and thus did not conform to miniaturization requirements of modern day PABXs.

Commonly assigned U.S. Pat. No. 4,723,280 (Meier) sets forth a constant current line circuit which utilizes a differential amplifier for transmitting audio signals to and from a subscriber's loop as well as detecting the amount of feed current flowing in the loop. The differential amplifier compares the detected feed current to a threshold value for establishing the constant current, and generates a D.C. voltage signal which varies in amplitude in response to variations in the amount of feed current flowing in the loop, resulting from variations in loop resistance, etc. The D.C. signal is passed through an integrator circuit in order to remove audio signal components and is applied to a voltage controlled D.C. power supply for increasing or decreasing feed voltage applied to the loop in response to a decrease or increase respectively in the feed current flowing in the loop, thereby maintaining constant feed current. The D.C. signal generated by the differential amplifier is regulated by the integrator circuit to a quiescent value of approximately zero volts, such that audio signals received from the subscriber's loop can be applied directly to an unbalanced transmit lead connected to the PABX, without requiring separate D.C. blocking signal translation circuitry.

The prior art constant current feed driver suffers from two significant weaknesses which prevent it from being used to provide CLASS services (e.g. caller ID). The first problem is that the ring driver is driven to saturation in the on-hook state. This prevents the transmission of the caller ID information. The second weakness is that the circuit ceases to function if the constant current requirement cannot be satisfied (e.g. if the loop range exceeds the design criteria or the terminal device or devices require more current than the circuit can provide). Specifically, once the ring driver is driven to saturation, the zero volt quiescent output of the differential amplifier cannot be maintained, resulting in incorrect tip bias.

SUMMARY OF THE INVENTION

According to the present invention, a line circuit is provided which operates as a constant current loopfeed circuit in the short loop condition. The constant current operation is as set forth in commonly owned U.S. Pat. No. 4,723,280 (Meier), the contents of which are incorporated herein by reference. However, according to the present invention the circuit is prevented from entering the saturation state as the looplength approaches and exceeds a predetermined amount, and instead reverts to a voltage feed operation. This allows the circuit to operate on longer loops as well as enabling on-hook transmission for CLASS service delivery.

BRIEF DESCRIPTION OF THE DRAWINGS

A detailed description of the preferred embodiment is set forth herein below with reference to the sole drawing, in which.

DETAILED DESCRIPTION OF THE PREFERRED EMBODIMENT

Figure 1:
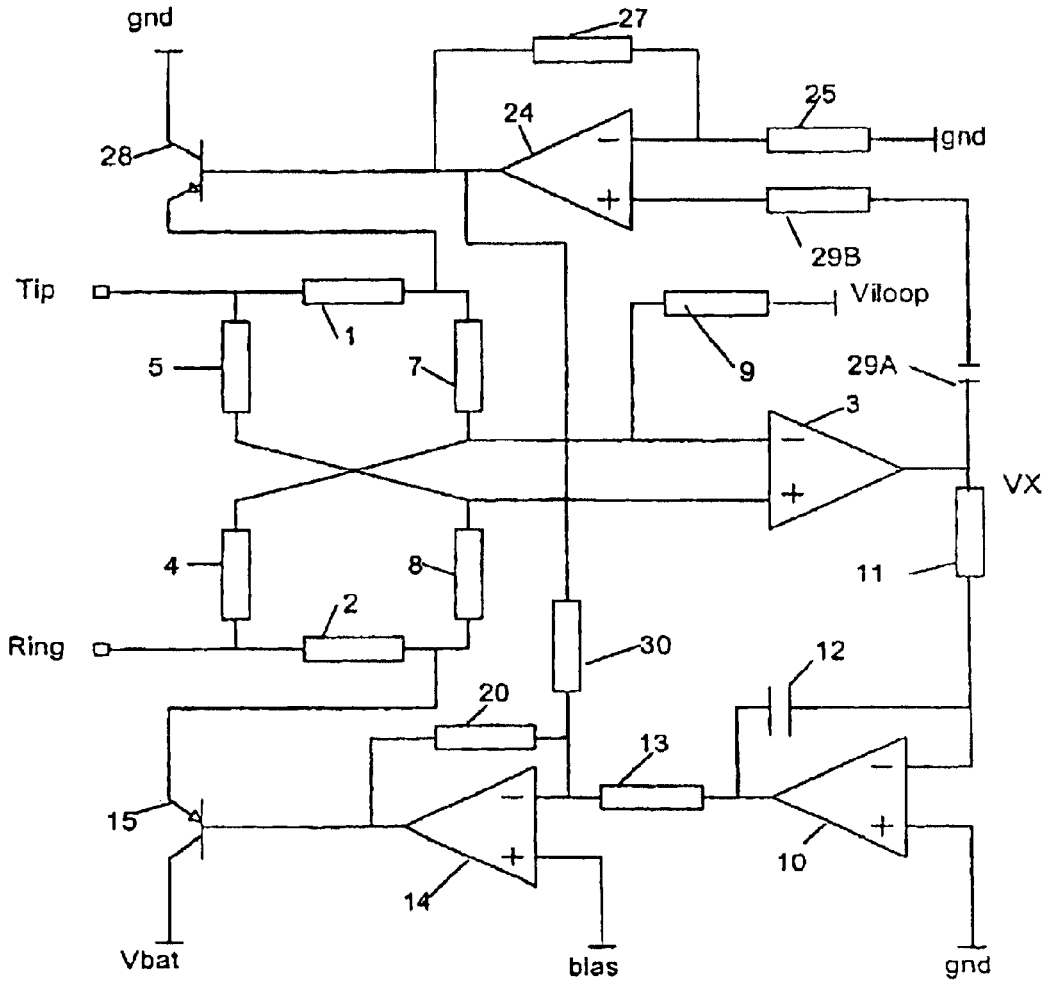
FIG. 1 is a schematic diagram of a constant current line circuit with CLASS features, according to the present invention.

With reference to FIG. 1, Tip and Ring terminals are provided for connection to tip and ring leads of a subscriber's loop connected to a remote telephone set. The Tip and Ring terminals are shown connected to feed resistors 1 and 2. Inverting and non-inverting inputs of a differential amplifier 3 are connected to the Ring and Tip terminals via input resistors 4 and 5, respectively.

The inverting and non-inverting inputs of differential amplifier 3 are also connected in respective circuit paths to feed resistors 1 and 2 via current sense resistors 7 and 8, respectively. The inverting input of amplifier 3 is connected to a source of reference voltage Viloop, via resistor 9.

The output of differential amplifier 3 is connected to a transmit audio signal terminal VX for passing audio signals received from the subscriber's loop to a PABX.

The output of differential amplifier 3 is also connected to an inverting input of a differential amplifier 10 via a resistor 11. The non-inverting input of differential amplifier 10 is connected to ground, and the output is connected to the inverting input via a capacitor 12. Differential amplifier 10 is thus configured as an integrator circuit, in a well known manner.

The output of differential amplifier 10 is a also connected via resistor 13, to an inverting input of a differential amplifier 14. A non-inverting input of differential amplifier 14 is connected to a source of bias voltage to bias the operating voltage of the ring driver by creating an offset voltage relative the ring driver voltage when the integrator saturates, as discussed in greater detail below. An output of differential amplifier 14 is fed back to the inverting input via feedback resistor 20. The resistances of resistors 13 and 20 establish the gain of amplifier 14. The output of amplifier 14 is also connected to the base of PNP transistor 15, an emitter terminal of which is connected to the ring feed junction of feed resistor 2 and current sense resistor 8. A collector terminal of transistor 15 is connected to the −48 V battery voltage. Thus, amplifier 14 and transistor 15 operate in conjunction as a ring driver for providing battery voltage to the ring lead of the subscriber's loop.

A receive audio signal on terminal VX is also applied to the non-inverting input of amplifier 24 via capacitor 29A and resistor 29B. Capacitor 29A prevents the voltage VX from altering the tip bias. An inverting input of differential amplifier 24 is connected to ground via resistor 25. An output of differential amplifier 24 is fed back to the inverting input thereof via resistor 27. The resistances of resistors 25 and 27 establish the gate of amplifier 24. The output of amplifier 24 is also connected to a base terminal of an NPN transistor 28 and to the inverting input of ring drive amplifier 14. A collector terminal of transistor 28 is connected to ground, and an emitter terminal thereof is connected to the node connecting feed resistor 1 and current sense resistor 7 (designated as the tip feed point). Thus, amplifier 24 and transistor 28 operate in conjunction as a tip driver. The tip driver is biased externally (not shown in the drawings).

Considering operation of the circuit for providing constant feed current, differential amplifier 3 senses the current flowing through feed resistor 2 by detecting the voltage thereacross via approximately equal valued input resistors 4 and 8, and the voltage across feed resistor 1 is detected via approximately equal valued input resistors 5 and 7. The voltages across feed resistors 1 and 2 are summed in differential amplifier 3 and compared therein with the Viloop reference voltage generated by the PABX and applied to the inverting input of amplifier 3 via resistor 9.

In the event of a sudden change in loop current, (e.g. due to the telephone set in the subscriber's loop going off-hook), differential amplifier 3 generates a D.C. voltage resulting from the comparison between the sensed loop current and the desired loop current (as determined by the reference voltage applied to the Viloop terminal). The D.C. voltage is applied to ring drive amplifier 14, via the integrator circuit, for varying the voltage applied to the ring terminal via feed resistor 2 and thereby providing a constant current feed at the desired current.

Differential amplifier 10 functions as an integrator circuit for removing A.C. audio signal components on the Tip and Ring leads and received by differential amplifier 3. Because the non-inverting input of differential amplifier 10 is connected to ground, the D.C. voltage on the inverting input thereof is drawn toward zero volts. Hence, the output voltage of differential amplifier 3 is regulated to a quiescent value of approximately zero volts.

The voltage output from differential amplifier 10 is received by amplifier 14, which in response drives the base terminal of PNP transistor 15. As the voltage applied to the base terminal changes, the collector current flowing in transistor 15 varies in response. The collector current flowing through transistor 15 drives the ring feed point.

According to the present invention, the line circuit enters a voltage feed mode when the integrator 10 saturates in response to the ring driver reaching its maximum positive output capabilities. The integrator 10 operates in saturation mode as the loop range extends beyond constant current design capabilities for the circuit. Thus, the integrator 10 saturates as it's output approaches the positive supply voltage. Since the ring drive amplifier 14 does not saturate prior to the integrator 10 saturating, the ring driver continues to operate in the linear region and the circuit thereby reverts to a voltage feed operation. While the integrator 10 is operating in saturation, it is no longer capable of responding to the error voltage presented by amplifier 3 for maintaining constant current supply. As a result, the integrator 10 output voltage remains constant as it's saturation voltage. The ring driver 14 maintains this fixed voltage level and the loop current becomes thereby dependant on the voltage feed level and the loop resistance. When operating in saturation mode, the circuit of the present invention treats an on-hook state as a very long loop and it is by this means that on-hook audio transmission is enabled.

In summary, the line circuit of the present invention utilizes a differential amplifier whose output is regulated in zero volts D.C. (when the subscriber's set is off-hook) by a negative feedback circuit, for controlling a voltage controlled power supply which provides a constant current feed to the subscriber's loop. The differential amplifier also transmits audio signals received from the subscriber's loop directly to a PABX via an unbalanced terminal. When the loop range exceeds a predetermined threshold, the circuit reverts to a voltage feed operation thereby allowing operation over long loop lengths and the ability to provide on-hook CLASS services.

Alternative embodiments and variations of the invention are possible, all of which are believed to be within the sphere and scope of the claims appended hereto.

What is claimed is:

1. A line circuit for providing loopfeed current to a subscriber's line, comprising:

driver circuitry for driving said subscriber's line with said loopfeed current;

an input amplifier circuit connected to said subscriber's line for sensing and comparing current flowing in said line with a predetermined constant current and generating an error signal proportional to any difference therebetween; and an integrator for receiving said error signal and in the event said error signal is less than a predetermined amount then controlling said driver circuitry with a variable voltage so as to maintain constant loopfeed current to said subscriber's line and in the event said error signal exceeds said predetermined amount generating a constant saturation voltage for controlling said driver circuit to provide a constant voltage feed to said subscriber's line.

2. The line circuit of claim 1, wherein said driver circuitry further comprises driver amplifiers for driving transistors connected to said subscriber's line.

3. The line circuit of claim 2, further comprising feed resistors connected to said subscriber's line across which voltage develops which is proportional to said current flowing in said line, said feed resistors being connected in a circuit to differential inputs of said input amplifier circuit for detection of said voltage.

4. The line circuit of claim 3, further comprising input and current sense resistors connected across said feed resistors and to said differential inputs of said input amplifier.

5. The line circuit of claim 4, further comprising a source of reference voltage proportional to said predetermined constant current applied to one of said differential inputs of said input amplifier.

* * * * *